May 18, 1926. 1,585,284
W. J. DE WITT
PROCESS OF AND APPARATUS FOR MAKING SHOE FORMS
Filed Jan. 30, 1925 4 Sheets-Sheet 1
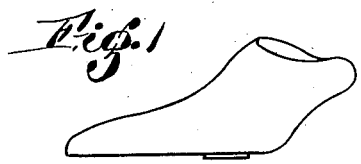
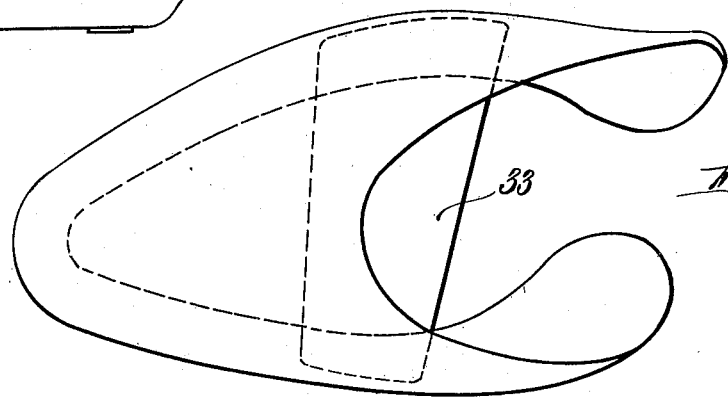
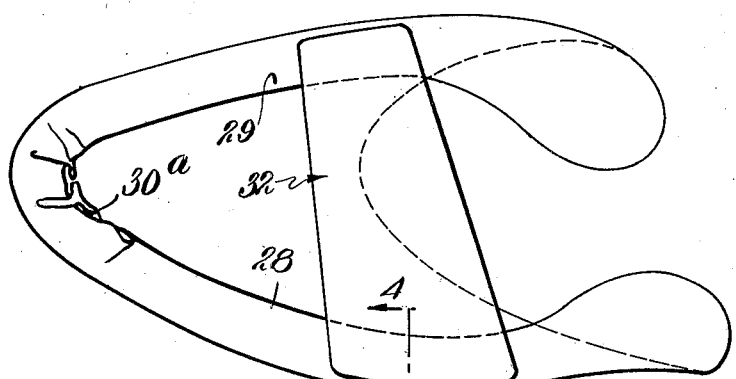
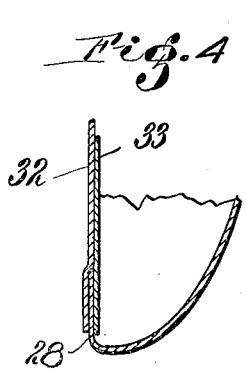
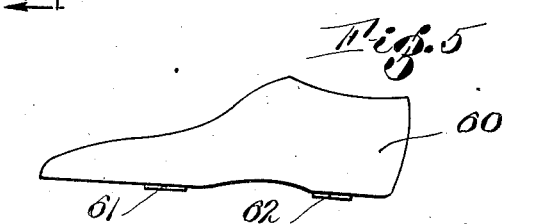
Inventor
William J. De Witt,
by Roberts Roberts & Cushman
Attys.

May 18, 1926.
W. J. DE WITT
1,585,284
PROCESS OF AND APPARATUS FOR MAKING SHOE FORMS
Filed Jan. 30, 1925  4 Sheets-Sheet 2
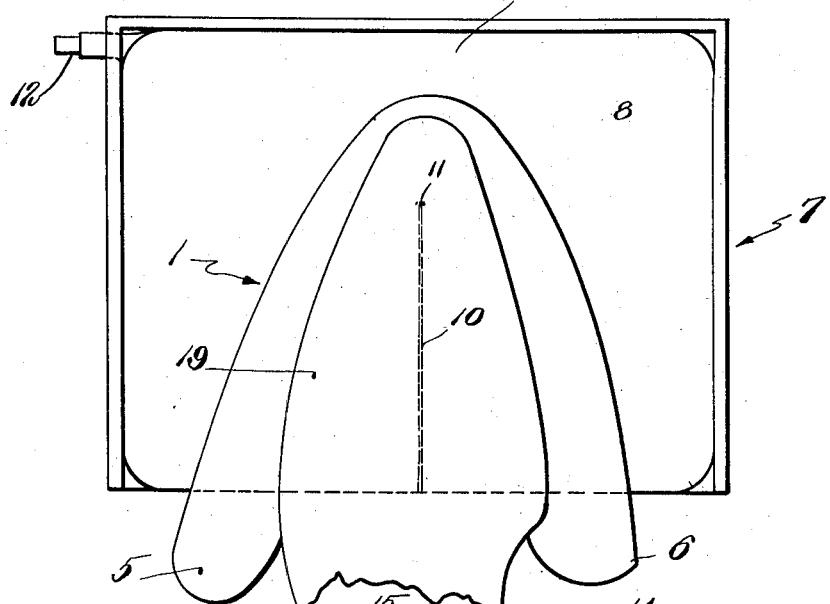
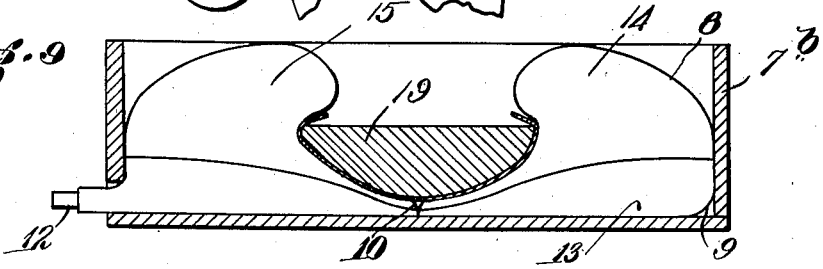
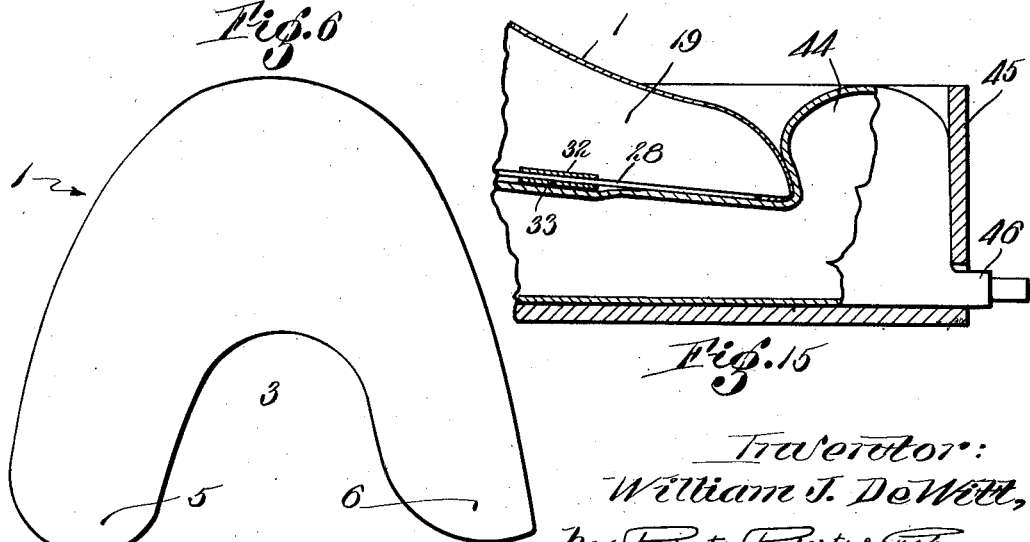
Inventor:
William J. DeWitt,
by Roberts Roberts & Cushman
Attys

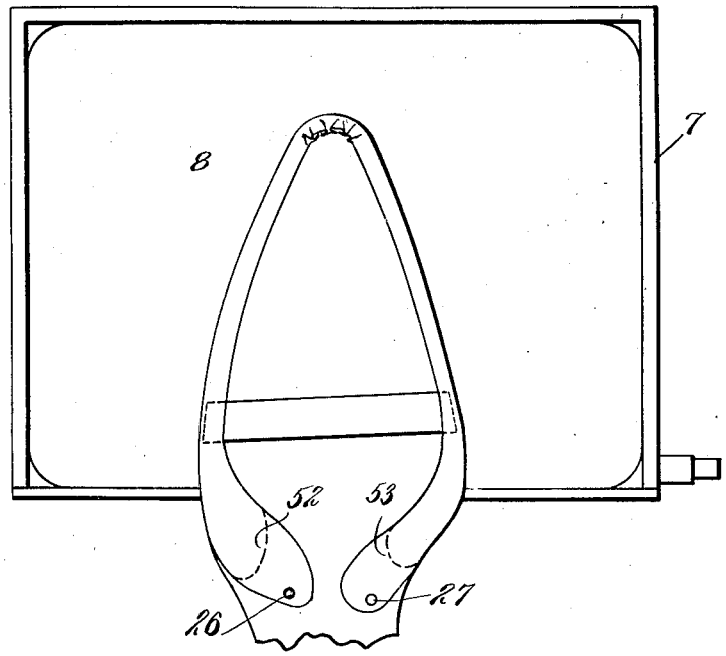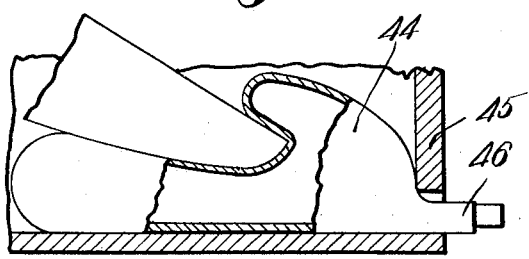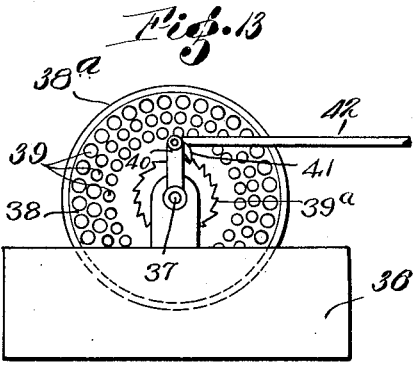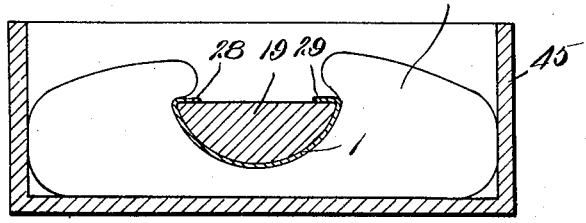

May 18, 1926.
W. J. DE WITT
1,585,284
PROCESS OF AND APPARATUS FOR MAKING SHOE FORMS
Filed Jan. 30, 1925   4 Sheets-Sheet 4
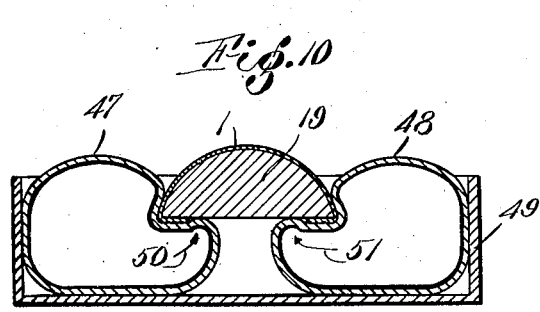
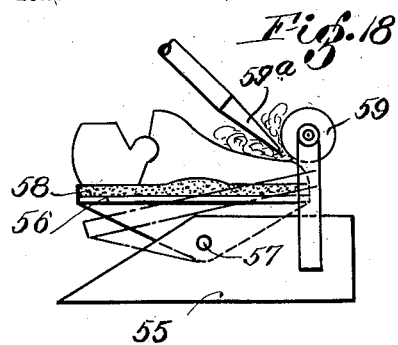
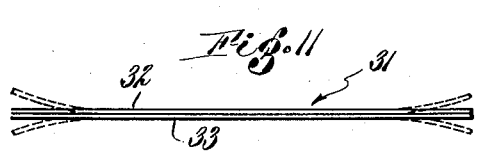
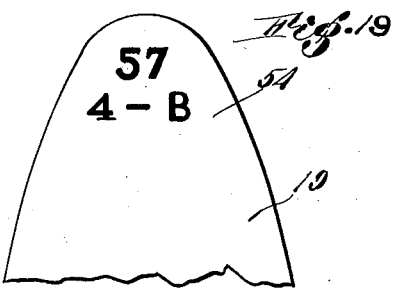
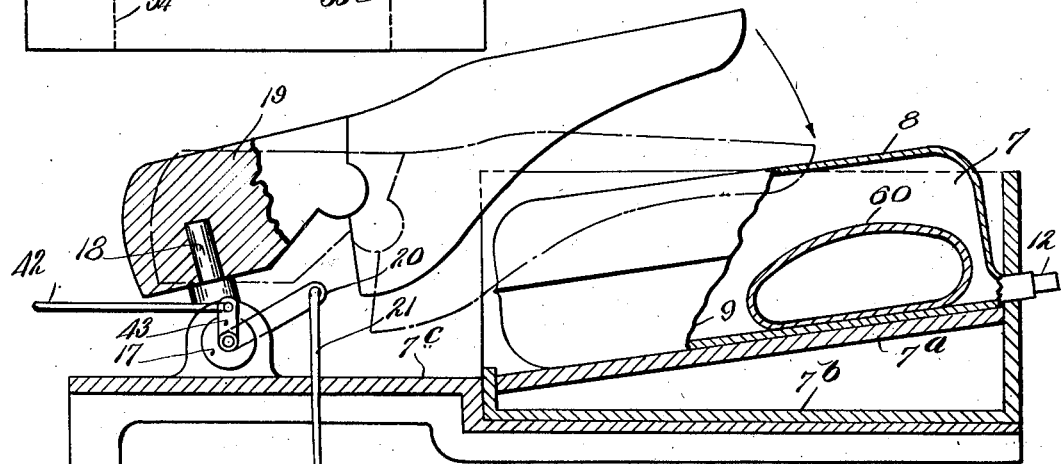
Inventor
William J. DeWitt,
by Roberts Roberts & Cushman
Attys Patented May 18, 1926.

1,585,284

UNITED STATES PATENT OFFICE.

WILLIAM J. DE WITT, OF AUBURN, NEW YORK.

PROCESS OF AND APPARATUS FOR MAKING SHOE FORMS.

Application filed January 30, 1925. Serial No. 5,746.

This invention pertains to hollow thin walled forms, for example, shaping forms or fillers for shoes and to the manufacture of the same.

Forms of the kind herein disclosed constitute one species of the genus which includes devices variously termed forms, trees, stiffeners, etc., some of which are intended for insertion in a finished shoe to preserve its shape temporarily while on exhibition or during intervals of wear, while others, for example toe-boxes, counters, etc., are adapted to be incorporated in shoes during the course of manufacture, the embodiment of the invention herein chosen for illustration being of that species which is placed temporarily in the completed or partially completed shoe when not in use, although it is contemplated that in some of its broader aspects the invention may be found useful in respect to devices belonging to other species of the genus.

While forms, such as herein disclosed are of utility under many circumstances, as for example for keeping shoes plumped out, smooth, and free from wrinkles while exposed for sale in shoe cases or store windows, they are designed primarily for the use of traveling salesmen to enable them to hold their sample shoes in proper shape during transportation and while on exhibition.

For this purpose it is important that the form be flexible and very light in weight while strong enough to fulfill its intended purpose properly, and essential that the outer surface of the form be substantially an exact replica, both in size and shape, of the last upon which the shoe to be placed thereon was made. It is also important that the size and shape of the form shall not change by reason of variations in temperature or atmospheric moisture.

I am aware that heretofore various attempts have been made to make such forms from plastic or sheet material, but so far as I know, the methods of production employed have all been unduly slow, and involve the use of adhesives, the formation of seams, or slow drying or baking operations which keep the last out of use for a long period, while the finished forms have in most instances been found to be oversized by reason of the necessary thickness of the material employed, and so rigid and unyielding as to impart to the shoe the "feel" of a low-grade leather. Moreover, such forms are heavy, and expensive to produce by the usual methods, and so brittle that they break when too closely packed.

In accordance with the present invention I am able to produce shoe forms of substantially the exact size and shape of the last upon which the shoe is made; to make forms of extremely light weight and having the desired stiffness and flexibility; to make such forms rapidly and cheaply; and to provide a form which is not affected by variations in temperature or atmospheric humidity, and which is so tough and resilient that it is not easily broken and when deformed tends to resume its original shape.

In the accompanying drawings I have illustrated by way of example a preferred embodiment of my invention, including the improved form itself, various steps in the process of making the form, and certain novel instrumentalities useful in performing such process.

In the drawings:—

Fig. 1 is a side elevation to small scale of a fore-part form removed from the last;

Fig. 2 is a plan view of the same form to larger scale;

Fig. 3 is a bottom view of the form upon the same scale as Fig. 2;

Fig. 4 is a fragmentary section substantially on the line 4—4 of Fig. 3;

Fig. 5 is a side elevation illustrating a modified form intended to fill the entire shoe;

Fig. 6 is a plan view of a blank suitable for making a form such as shown in Figs. 1, 2, and 3;

Fig. 7 is a plan view of a steam cushion useful in performing the improved process,—showing the blank in position upon the cushion and the fore-part of a last resting upon the blank;

Fig. 8 is a view similar to Fig. 7 but showing the blank and last in a later stage in the process;

Fig. 9 is a front elevation of the cushion shown in Fig. 7 showing the last and the cushion support in section and the blank at a stage in the process intermediate those shown in Figs. 7 and 8;

Fig. 10 is a vertical transverse section illustrating another appliance useful in performing a later step of the process, the last with the blank carried thereby being shown in section;

Fig. 11 is an edge view of a two-ply cross bar constituting an element of the finished form;

Fig. 12 is a plan view of the cross bar shown in Fig. 11;

Fig. 13 is a side elevation of a device useful in applying adhesive to the cross bar of the form;

Fig. 14 is a vertical section through an appliance somewhat similar to that shown in Fig. 10 but of modified form;

Fig. 15 is a view similar to Fig. 14 but illustrating a different mode of using the appliance;

Fig. 16 is a front elevation of the device shown in Fig. 14, showing a last transverse section;

Fig. 17 is a side elevation of a machine embodying the cushion of Fig. 7 as an element and adapted to press the last into contact with the cushion to pull or draw the form above the last;

Fig. 18 is a side elevation of an appliance useful in impressing the form with suitable indicia and in flattening and shaping the lower edges of the form; and Fig. 19 is a fragmentary top plan view of the fore-part of a last furnished with incised or intaglio indicia for use with the appliance of Fig. 18 in impressing the finished form with identifying indicia.

As a concrete example of the mode of practising my improved process and of a product of such process, I have selected a hollow shoe form or stiffener and its manufacture as the subject matter of the following detailed description and for illustration in the drawings, it being understood that the shoe last hereinafter referred to constitutes merely an example of a model or mold block upon which the form may be made and that the completed form may be of almost any desired shape in accordance with the contour of the selected model or mould block.

The form herein disclosed may be made of any suitable material having the necessary physical characteristics. Among other substances with which I have experimented I have found celluloid and phenol-formaldehyde artificial resin to be very satisfactory. For convenience in description I have referred hereinafter to celluloid as the material of the improved form, but so far as the broader aspects of the invention are concerned do not wish to restrict myself to this particular material.

Referring to Fig. 6, the numeral 1 indicates in general a blank of substantially U shape which may be cut or punched from a sheet of the selected material, or which may otherwise be prepared, for example by moulding the individual blanks from the material in plastic or fluid condition or slicing the blank from a properly shaped block. This blank, by whatever process prepared, comprises the fore-port 2 and the spaced legs 3 and 4 which terminate at the corners 5 and 6 respectively. Preferably, these blanks are unsymmetrical, permitting them to be conformed to right and left lasts without necessitating undue trimming at a later stage in the operation.

While it is possible to conform this blank to a last by hand or by other means than that herein disclosed, I prefer to employ the appliances illustrated in the drawings. The appliance shown more particularly in Figs. 7, 8 and 17 is designated generally by the numeral 7, and consists essentially of a cushion or bag comprising the upper wall 8 and the lower wall 9. Both walls may be of the same material if desired, but it is contemplated that under most circumstances the upper wall will be of some material, for example textile fabric, which is porous or at least to some extent pervious to steam. This bag preferably rests upon a forwardly inclined support $7^a$ forming a false bottom for an open topped box $7^b$ whose sides confine the cushion laterally.

The upper and lower walls of this cushion or bag are preferably, though not necessarily united by a seam 10 extending from the front of the cushion toward the rear, but terminating at a point 11 at some distance from the rear edge of the cushion. The cushion is provided at a convenient point with an inlet connection 12 through which steam or any other suitable elastic fluid may be admitted to inflate the cushion. By reason of the seam at 10 uniting the upper and lower walls of the cushion the forward part of the cushion when inflated assumes the form of two upwardly convex lobes 14 and 15 respectively whose upper surfaces gradually merge into each other at the rear central part of the cushion as indicated at 16 (Fig. 7).

This cushion my be employed if desired to assist in performing the desired operation without further adjuncts, but it is preferred to combine with the cushion the other mechanical features illustrated in Fig. 17. For this purpose the box $7^b$ is preferably mounted upon a table or stand $7^c$ supporting bearings for a shaft 17 extending substantially parallel to the front edge of the cushion and spaced from the latter. This shaft 17 carries an upwardly directed spindle 18 upon which a last 19 may be mounted. The shaft 17 is also furnished with an arm 20 to which a link 21 is connected, the lower end of the link being pivotally secured to a treadle lever 22. Preferably the link 21 is furnished with a locking pawl 23 adapted, when the treadle lever is depressed to pass below and to engage the under surface of a fixed stop 24, thus holding the treadle in its depressed position until the locking pawl 23 is released. The spindle 18 is so disposed that when the shaft 17 is rocked the spindle moves substantially in the vertical plane of the seam 10 of the bag 7.

The first step in the operation of conforming the blank 1 to the last 19 consists in laying the blank upon the upper surface of the bag 7 with its axis of symmetry substantially in the vertical plane of the seam 10 of the bag. It being understood that the bag has already been inflated with hot steam, the heat of the bag, assisted by the moisture condensed from the steam which exudes through the pores of the bag, rapidly softens the blank and when the last 19 is placed upon the spindle 18 and the treadle lever 22 is depressed the downwardly swinging forepart of the last engages the blank at its center and thrusts the latter down into and between the lobes 14 and 15 of the bag or cushion.

As the surface of the blank adheres to some extent to the surface of the cushion this downward thrust tends to drag or draw the side portions of the blank up around the sides of the last while at the same time the toe portion of the blank is conformed to the toe of the last. When the treadle has been sufficiently depressed it is locked by engagement of the pawl 23 with the abutment 24, and the operator now seizes the outer corners 5 and 6 of the blank and draws them up over the shank of the last and secures them by means of tacks 26 and 27, or other form of fasteners, for example, a pin or pins projecting from the bottom of the last. This upward and rearward pull exerted at the rear corners of the blank, assisted by the inward bulging of the bag over the bottom of the last, Fig. 9, tends to turn in the upwardly projecting edges of the blank to cause them to overlie the bottom of the last and form flanges 28 and 29 respectively. Due to the fullness of the material at the toe of the last, wrinkles 30 tend to form at this point.

After the steps above described have been completed the treadle is released and the last with the partially moulded form is removed from the steam cushion 7. The toe portion of the last with the form thereon may then be thrust into a pneumatic cushion 44 (Fig. 14) preferably mounted in an open topped box 45 and which is inflated with air through a suitable valve connection 46. This cushion is preferably of cylindrical form and when the fore-part of the last is thrust into its upper wall the fluid pressure acting in all directions against the blank tends to smooth it and conform it closely to the toe of the last, at the same time cooling the blank and tending to cause it to set.

If desired, either in substitution for or in addition to the last described step, the last may be thrust right side up between a pair of tubular pneumatic cushions 47 and 48 (Fig. 10) respectively. These cushions are conveniently mounted in a box-like support 49 and when the last is thrust vertically downward between these cushions the action of the cushions is to draw the flange portions of the blank inwardly in opposite directions as indicated by the arrows 50 and 51 in Fig. 10 (thus causing it to lie flat against the bottom of the last). Either or both of the last operations described tend to flatten the wrinkles at the toe portion of the blank until they assume the shape indicated at 30$^a$ in Fig. 3.

At this point or at some later stage in the operation as may be desired, a cross bar 31 is placed across the ball portion of the last and is attached at its opposite ends to the flanges 28 and 29 respectively. This cross bar may consist of a single piece of sheet material similar to that employed in making the body of the form, or any other suitable material if desired. The ends of this cross bar may be attached to the body of the form by staples, adhesive or any other suitable fastening means.

As herein disclosed, I prefer to employ a two-ply cross bar comprising superposed registering strips 32 and 33 respectively, which as indicated in Figs. 11 and 12 are secured one to the other at their middle portions, for example between the lines 34 and 35 of Fig. 12 but which are free from each other at their end portions. In applying this two-ply cross bar, the ends of one ply, for example, the ply 33, are slipped between the bottom surface of the last and the flanges 28 and 29 of the form, while the ends of the other ply 32 overlap said flanges.

While as above stated this cross bar may be secured by means of rivets, staples or adhesive, I prefer, when such bar is made of celluloid, to attach it to the body of the blank in a homogeneous or substantially integral manner by the use of a solvent for the celluloid. For applying such solvent in a convenient fashion I prefer to employ the device shown in Fig. 13, which comprises a receptacle 36 for the solvent and a thin disk 38, preferably having a bevelled or V-edge 38$^a$, mounted upon a shaft 37 to rotate in a vertical plane with its lower portion dipping into the solvent in the receptacle 36. To facilitate the lifting of solvent by means of the disk I prefer to provide the latter with series of circumferentially spaced recesses or openings 39 extending entirely or part way through the disk. While this disk may be turned in any desired manner, I prefer to provide it with a ratchet wheel 39$^a$ and to move the ratchet wheel step by step by means of a lever 40 free to turn on the shaft 37 and carrying a pawl 41 engaging the teeth of the ratchet wheel 39$^a$. The lever 40 may be rocked in any suitable manner, for example by connecting it through a link 42 to an arm 43 projecting from the shaft 17 (Fig. 17) so that at each actuation of the treadle 22 the disk 38 is given a partial rotation.

When the cross bar 31 is to be applied, its plies are separated and straddled over the edge of the disk 38 which simultaneously coats the opposed inner surfaces of the plies with solvent. When the bar is placed in position, its plies embrace the flanges 28 and 29 of the blank and the celluloid solvent attacks the surfaces of the flange and the cross bar and by partially dissolving them causes them to cohere in a homogeneous or integral fashion when the solvent evaporates. The rapid evaporation of the solvent and the final shaping and flattening of the flanges and cross bar is conveniently accomplished by pressing the bottom of the last against the steam bag 7 or some other heated surface and then while the material of the form is still mobile, pressing the bottom of the last against the bag 44 as shown in Fig. 16 which completes the shaping and cools and sets the material. After these operations have been completed the form is allowed to cool completely while upon the last and the corners 5 and 6 are released from the fasteners and trimmed off along the lines 52 and 53 (Fig. 8) thus completing the form.

For the purpose of identifying the finished forms as to the shape and size of the last upon which they were lasted, it is desirable to provide them with suitable indicia during the process of lasting. In accordance with a preferred mode of procedure, the last, as shown for example in Fig. 19, is provided with incised or intaglio indicia such as indicated at 54. Just before the finished form has completely cooled and before it is withdrawn from the last, the last with the form thereon is mounted upon the cushion surface 58 Fig. 18, (heated if desired) of tilting table 56 pivoted to swing about a horizontal axis 57 upon a base or support 55. This table is then tilted downwardly as indicated in dotted lines in Fig. 18 until the toe portion of the last is brought into forcible engagement with the resilient pressure roll or pad 59. To facilitate the operation the pad may be heated, for example by a steam jet 59ª. The pressure of this roll or pad causes the material of the blank to sink into the incised indicia on the last and as the blank cools the depressions are retained, thus forming integral indicia upon the form indicating with certainty the particular last upon which the form was made. While this mode of applying indicia is regarded as very desirable, it is of course to be understood that the indicia may be provided in other ways and either before or after the completion of the form.

For example, the cushion may be provided with an inner resilient stop pad 60, Fig. 17, preferably consisting of an inflated rubber tube or bag and so positioned that as the last sinks down into the cushion 7 its movement will be limited by engagement with the pad 60. If the last be provided with incised indicia at the toe, the sheet material will be forced into such indicia by the pressure of pad 60, while in any event, even though the last be unprovided with such indicia, the pressure of the pad at this point assists in conforming the sheet material to the toe portion of the last.

When the form is made of celluloid, bakelite, or substances of similar physical properties, the material employed may be so thin, while providing all the stiffness necessary, that it does not appreciably differ in its outer size and configuration from that of the last upon which it was made. However for greater exactness, it is preferred to subject the last to a preliminary operation to prepare it for the steps of the process above described.

To this end the last is subjected to heat or a dry atmosphere for a sufficient length of time to reduce its size to an amount equivalent to the thickness of the sheet material which is to be employed in making the form. After the shrinking process the pores of the last are filled or impregnated with a moisture-resistant medium so that the last remains in this shrunken condition indefinitely. When made upon a last so treated, the completed form has an outer configuration and size which is exactly like that of an untreated last of the same size and style so that when the form is placed within a shoe made upon such an untreated last it fills the shoe to the same extent as the last upon which the shoe was made. The shoe thus presents the most attractive appearance possible, being wholly free from wrinkles or protuberances, while the form thus provided is so resilient and flexible that it does not detract from the "feel" of the leather of the shoe and does not materially add to its weight. Obviously similar results could be obtained by making the last of some material not affected by moisture, for example bakelite and making the last sufficiently under the standard size to compensate for the added thickness of the hollow form.

It may be noted that the essential features of the lasting process herein described are applicable to the lasting of sheet material whether employed in making fore part forms such as shown in Figs. 1 to 3 inclusive, stiffeners of other kinds, or in making whole shoe forms 60 such as shown in Fig. 5. When such a whole shoe form is made, it may be provided with one or more cross bars 61 and 62 respectively as may be deemed desirable, or the necessary stiffness may be secured by increasing the width of the side flanges.

While I prefer to employ the pervious steam filled cushion above described, I contemplate an alternative arrangement in which the cushion need not be pervious, though still elastic, consisting for example of a rubber tube or bag inflated with air or steam, and in which the cushion is enclosed in a suitable chamber which may be heated, for example by steam pipes or the admission of steam. Such an arrangement, while perhaps having some disadvantages, may at times be found useful, and I regard it as falling within the purview of the present invention.

The process above described differs materially from most processes of lasting shoes in that the material being lasted is pressed against the surface of the last at substantially all points in a direction normal to such surface while at the same time it is subjected to a tension which is distributed throughout its entire area and is not confined to a few points as is true of the usual lasting process.

While I have disclosed various devices useful in performing the process, it is to be understood that the process may be carried out in other ways and by other means than those herein illustrated. It is also contemplated that the several steps of the process may be performed in somewhat different order from that herein described and that under some circumstances certain steps may be omitted altogether or that other steps may be substituted therefor without departing from the spirit of the invention.

I claim:

1. That process of preparing hollow shoe forms which comprises subjecting a sheet of normally stiff material to the combined action of heat and moisture to make it pliable, and conforming said material to the outer surface of a rigid last by pressing the last upon said material while supporting the latter upon a mobile cushion.

2. That process of making shoe forms which comprises subjecting a piece of normally stiff sheet material to the direct action of steam whereby to render it pliable and conforming such material to a shoe last by pressing the last upon the material while the latter is supported upon a fluid cushion.

3. That process of making shoe stiffeners which comprises preparing a blank from normally hard material, softening said blank by the application of heat and moisture, placing the forepart of an inverted shoe last upon the softened blank, drawing the lateral edges of the blank over into the bottom of the last, and pressing the last upon the blank while the latter rests upon a steam filled cushion whereby to conform the blank to the last.

4. That process of lasting sheet celluloid which comprises subjecting the celluloid to the action of heat in the presence of moisture and simultaneously conforming the celluloid to a rigid last by pressure, the pressure acting normally to the surface of the last at all points.

5. That process of lasting sheet celluloid which comprises subjecting the celluloid to the combined heating and moistening action of steam and simultaneously conforming the celluloid to the surface of a rigid last by the action of fluid pressure.

6. That process of lasting sheet celluloid which comprises pressing the last forcibly against the sheet celluloid while supporting the latter upon a pervious cushion inflated with elastic fluid.

7. That process of making shoe forms which comprises preparing a blank from sheet celluloid, supporting the blank upon a pervious cushion inflated with steam, pressing an inverted last upon the blank, drawing the opposite sides of the blank up over the bottom of the last and temporarily securing them in position, withdrawing the last and permitting the celluloid to cool, removing the lasted form from the last, and trimming the form to final shape.

8. That process of molding hollow shoe forms which comprises softening a piece of sheet celluloid and conforming it to the upper surface of a shoe last, placing a celluloid cross bar over the bottom of the last, moistening the opposite ends of the bar with a solvent for celluloid and pressing them against the edges of the sheet material at the ball of the last and removing the molded form from the last after the ends of the bar have become firmly attached to the edges of the form.

9. That process of making shoe forms which comprises softening a sheet celluloid blank and conforming it to the top surface of a shoe last by fluid pressure, drawing the edges of the blank over the bottom of the last to form inturned attaching elements, causing the opposite ends of a cross bar to adhere to said attaching elements by the application of a celluloid solvent to the meeting surfaces of said parts, and thereafter withdrawing the last from the form.

10. That process of making shoe forms which comprises preparing a U-shaped blank of sheet material, supporting the blank upon a pervious cushion inflated with a pressure fluid, pressing an inverted last upon the blank to conform the latter to the last, drawing the ends of the blank over onto the bottom of the last at the shank and temporarily securing such ends to the last and connecting opposite edges of the lasted blank by means of a cross bar extending across the ball of the last, and thereafter removing the last from the form.

11. That process of making shoe forms which comprises cutting a blank from sheet celluloid, conforming the blank to the last by pressing the latter against the blank while supporting the latter upon a pervious steam-filled cushion, removing the moulded blank and last from the steam cushion, and pressing the moulded blank against a cushion filled with relatively cool fluid to set the blank.

12. That process of making shoe forms which comprises cutting a blank from sheet material, conforming the blank to a last by pressing the last against the blank while the latter rests against a pervious cushion from which hot steam exudes, drawing the edges of the blank over the bottom of the last to form an inturned marginal flange, securing the opposite ends of a cross bar to opposed parts of the flange, removing the moulded form from the steam cushion, and thrusting it forcibly into a relatively cool pneumatic cushion whereby further to mould the blank and to cause it to set in the desired shape.

13. That process of making hollow shoe forms which comprises conforming a sheet blank to a shoe last by pressing the inverted last against the blank while supporting the latter upon a pervious cushion filled with hot steam, drawing the free edges of the blank inwardly over the bottom of the last, removing the moulded form from the steam cushion and thrusting it right side up while still on the last, into an elastic cushion filled with cool fluid whereby to press said inwardly drawn edges of the blank closely against the bottom of the last and to cause it to set in such position.

14. That process of making hollow celluloid shoe forms which comprises providing a last with intaglio indicia at a suitable point in its surface, softening a sheet celluloid blank by the application of heat and moisture and conforming it to the last so prepared, and subjecting the form while still on the last to resilient pressure at the region of the indicia in the last to force the material of the form into said indicia whereby to provide the form with impressed indicia.

15. That process of making shoe forms of sheet material which comprises selecting a last of the same shape and size as the last upon which the shoe, for which the form is intended, was lasted, shrinking said last approximately a half size, impregnating the last with a waterproofing solution, lasting the form upon said prepared last, and removing the completed form from the last.

16. That process of making a form for insertion in a finished shoe which comprises preparing a form moulding last of the same style as that on which the shoe was lasted but so much smaller than said shoe last that when covered with sheet material the outer surface of said material will be of the exact size of the shoe last, molding the sheet material to conform to the outer surface of said prepared last, treating said molded sheet material to cause it to retain its lasted shape, and removing the completed form from the moulding last.

17. An appliance useful in lasting shoe stiffeners of sheet material comprising a cushion or bag, and means for supplying hot steam to the interior of the cushion or bag to inflate the latter, the cushion or bag being of pervious material permitting steam to exude therefrom.

18. An appliance useful in lasting shoe stiffeners of sheet celluloid comprising a cushion having upper and lower walls, the upper wall being flexible and being united to the lower wall along a median line extending part way across the cushion, whereby, when the cushion is inflated with fluid two distinct lobes are produced in the upper surface of the cushion at its forward part, the upper wall at least of the cushion being of material which is pervious to steam.

19. An appliance for use in lasting shoe stiffeners comprising a steam inflated cushion whose upper surface at its forward part consists of two distinct lobes, said lobes merging toward the rear of the cushion, a last supporting spindle pivoted to swing substantially in the vertical plane of separation of the cushion lobes, and means for swinging said spindle whereby to press the forepart of a last mounted thereon downwardly against said cushion between the lobes of the latter.

20. An appliance for use in lasting shoe stiffeners comprising a steam inflated cushion whose upper wall is pervious to steam, a last supporting spindle pivoted to swing in a vertical plane, means to swing said spindle whereby to press the forepart of the last downwardly into the upper part of the cushion, and means for locking the spindle in the latter position.

21. An appliance for use in lasting shoe stiffeners comprising a box open at its top and in front, a substantially cylindrical rubber bag arranged transversely of the box and engaging the bottom and the rear and end walls of the box and means for inflating said bag with a cool fluid to provide an elastic cushion into which a moulded and previously heated stiffener may be thrust to cool and set.

22. An appliance useful in preparing shoe forms of sheet celluloid by lasting such celluloid upon a last having intaglio indicia in its surface which comprises a resilient pressure element, and means for heating and moistening the celluloid and forcing the celluloid against said resilient element whereby to force said material into the indicia of the last.

23. An appliance useful in preparing shoe forms of sheet material by lasting them upon a last having intaglio indicia in its surface comprising a tilting table for supporting the under surface of the forepart of a last having the lasted form thereon, and a resilient heated roll spaced above the table to engage the form and force it into the indicia in the last when the table is tilted to move the last upwardly toward the roll.

24. An appliance useful in preparing shoe forms of sheet material by lasting them upon a last having incised indicia in its surface comprising a cushion for supporting the material, means for admitting heated elastic fluid to the cushion to inflate it, a resilient stop member disposed within the cushion, and means for forcing a last down upon the sheet material resting upon the heated cushion whereby to conform said material to the last, the downward movement of the last being arrested by the resilient stop, the latter tending to press the sheet material into the incised indicia in the last.

Signed by me at Boston, Massachusetts, this 16th day of January, 1925.

WILLIAM J. DE WITT.